(12) United States Patent
Shah et al.

(10) Patent No.: US 11,687,898 B2
(45) Date of Patent: *Jun. 27, 2023

(54) SYSTEMS AND METHODS FOR AUTONOMOUS BANKING RESOURCES

(71) Applicant: Capital One Services, LLC, McLean, VA (US)

(72) Inventors: Salik Shah, Washington, DC (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,700

(22) Filed: Aug. 9, 2022

(65) Prior Publication Data
US 2022/0383280 A1 Dec. 1, 2022

Related U.S. Application Data

(63) Continuation of application No. 16/894,543, filed on Jun. 5, 2020, now Pat. No. 11,461,748, which is a continuation of application No. 16/248,363, filed on Jan. 15, 2019, now Pat. No. 10,713,632.

(51) Int. Cl.
*G06Q 20/10* (2012.01)
*G06N 5/02* (2023.01)
*G01S 19/13* (2010.01)

(52) U.S. Cl.
CPC .......... *G06Q 20/1085* (2013.01); *G01S 19/13* (2013.01); *G06N 5/02* (2013.01)

(58) Field of Classification Search
CPC ............ G06Q 20/1085; G06Q 20/4014; G01S 19/13; G01S 19/14; G06N 5/02; G06N 20/00
See application file for complete search history.

*Primary Examiner* — Elda G Milef
(74) *Attorney, Agent, or Firm* — Perkins Cole LLP (57) ABSTRACT

Systems and methods for autonomous banking resources are disclosed. Embodiments include a mobile banking resource including an unmanned motorized vehicle, a controller configured to control the movement of the motorized vehicle, an authentication device configured to verify the identity of a user, a server configured to communicate with the controller and the authentication device, and a user interface module configured to interface with the user conducting a transaction. The user interface module may include a user input device configured to receive user input, and a communication interface module configured to communicate with a server and the user input device. The controller may be configured to operate the motorized vehicle to move the motorized vehicle to a location based on a predicted behavior of the user.

20 Claims, 6 Drawing Sheets

SYSTEMS AND METHODS FOR AUTONOMOUS BANKING RESOURCES

CROSS-REFERENCE TO RELATED APPLICATION(S)

This application is a continuation of U.S. patent application Ser. No. 16/894,543, filed Jun. 5, 2020, which is a continuation of U.S. patent application Ser. No. 16/248,363, filed Jan. 15, 2019, the content of which is incorporated herein in its entirety by reference.

TECHNICAL FIELD

The present disclosure relates generally to systems and methods for autonomous banking resources, and more particularly, to systems and methods for conducting a transaction using an autonomous mobile banking resource.

BACKGROUND

An automated teller machine (ATM) is an electronic banking outlet that allows customers to complete basic transactions without the aid of a branch representative or a teller. Anyone with a credit card or debit card can access most ATMs. A basic ATM unit may allow customers to withdraw cash and receive reports of their account balances. More complex machines accept deposits, facilitate line-of-credit payments, report account information, and, in some cases, allow audio-video conferencing with a bank representative. Although use of ATMs has declined in recent years, the ATM continues to enjoy a niche market and demand even in modern culture.

At the advent of ATMs, units were installed only within the premises of a bank or a lending agency. With increasing popularity and a paradigm shift in retail shopping behavior, ATM units became commonplace on the streets, malls, grocery stores, and other such locales where a customer may be expected to require cash. Drive-through ATMs and 24-hour ATM units may provide a quick and convenient access to banking services as well.

Though ATMs are strategically located and provide a fast and convenient banking alternative, there are significant safety and security concerns for customers. As an example, a customer walking a few blocks after withdrawing cash from an ATM is a target for robbers. Similarly, a customer walking a few blocks to deposit money into an ATM may also be at risk of robbery. Additionally, during peak operation hours, there may be long queues and wait times to access an ATM, which, while being inconvenient, may also be unsafe.

The disclosed systems and methods for autonomous banking resources address one or more of the problems set forth above and/or other deficiencies in the prior art

SUMMARY

One aspect of the present disclosure is directed to a mobile banking resource including an unmanned motorized vehicle, a controller configured to control the movement of the motorized vehicle, an authentication device configured to verify the identity of at least one of a potential user or users, and an interface module configured to interface with the at least one of the potential user or users conducting a transaction. The interface module may include an input device configured to receive user input and a communications module configured to communicate with a server and the input device. The controller may be configured to operate the motorized vehicle to move the motorized vehicle to a location based on a predicted behavior of the at least one of the potential user or users, a predicted activity of the at least one of the potential user or users, or a predicted event.

Another aspect of the present disclosure is directed to a mobile banking resource including an unmanned motorized vehicle, a controller configured to control the movement of the motorized vehicle, an authentication device configured to verify the identity of at least a potential user or users, a server configured to communicate with the controller and the authentication device, and an interface module configured to interface with the at least one of the potential user or users conducting a transaction. The interface module may include an input device configured to receive an input, and a communication interface module configured to communicate with a server and the input device. The controller may be configured to operate the motorized vehicle to move the motorized vehicle to a location based on a predicted behavior of the at least one of the potential user or users, a predicted activity of the at least one of the potential user or users, or a predicted event.

Another aspect of the present disclosure is directed to a mobile banking resource including an unmanned motorized vehicle. The unmanned motorized vehicle may include a server for predicting a status of the mobile banking resource and predicting a user location, a controller configured to communicate with the server, and control the movement of the motorized vehicle to the user location based on the predicted status of the mobile banking resource. The unmanned motorized vehicle also includes a user interface module comprising a user input device configured to communicate with the controller and the server.

Another aspect of the present disclosure is directed to a mobile banking resource system comprising a plurality of mobile banking resources. Each of the plurality of mobile banking resources may include an unmanned motorized vehicle, a controller configured to control the movement of the motorized vehicle, and a user interface module comprising a user input device configured to communicate with the controller. The mobile banking resource system may also include a server configured to predict a status and location of a first mobile banking resource of the plurality of mobile banking resources, predict availability of a second mobile banking resource of the plurality of mobile banking resources, determine whether the second mobile banking resource is needed based on the status of the first mobile banking resource, and cause the second mobile banking resource to be deployed to the location of the first mobile banking resource, based on the determination.

In yet another aspect of the present disclosure, a method for conducting a transaction using a mobile banking resource is disclosed. The method comprises predicting, by a server, a location where the mobile banking resource is needed based on at least one of a predicted behavior of at least a potential user or users, a predicted activity of the at least one of the potential user or users, or a predicted event. The method may comprise configuring a controller to control the movement of the mobile banking resource to the predicted location of the at least one of the potential user or users, authenticating, by an authentication device, the identity of the at least one of the potential user or users, and granting the at least one of the potential user or users access to a user interface module for conducting the transaction. The user interface module may include an input device configured to receive an input, and a communication interface module configured to communicate with the server and the input device.

In yet another aspect of the present disclosure, a method for conducting a transaction using an unmanned motorized vehicle is disclosed. The method may include predicting, by a server, a status of the vehicle and location of at least one of a potential user or users. The method may further include configuring a controller to communicate with the server and control movement of the vehicle to the predicted location based on the predicted status of the vehicle, and verifying an identity of the at least one of the potential user or users. The method may also include granting the at least one of the potential user or users access to an interface module for conducting the transaction. The interface module may include an input device configured to receive an input; and a communication interface module configured to communicate with the server and the input device.

In some embodiments, the user interface module of the mobile banking resource may further include a graphical user interface, an audio-visual interface, or a teletypewriter. The user interface module may be located within the motorized vehicle.

In some embodiments, the motorized vehicle of the mobile banking resource may further include a secure compartment for the at least one of the potential user or users to conduct the transaction.

In some embodiments, the authentication device of the mobile banking resource is configured to communicate with at least one of the interface module or the server.

In some embodiments, the mobile banking resource comprises an automated teller machine (ATM).

In some embodiments, the mobile banking resource may include a global positioning system (GPS) locator configured to determine the location of the motorized vehicle.

In some embodiments, the controller of the mobile banking resource is configured to operate the motorized vehicle based on a predicted activity of the at least one of the potential user or users. The controller may be physically and operatively connected with the motorized vehicle and configured to communicate with the server.

In some embodiments, the mobile banking resource may be configured to communicate with one or more mobile banking resources through the server. The controller and the communication interface module may be configured to receive instructions from the server.

In some embodiments, the controller of the mobile banking resource may be configured to operate the motorized vehicle to a location based on a predicted activity of the potential user or users or a predicted event.

In some embodiments, a first server of a first mobile banking resource and a second server of a second mobile banking resource are configured to communicate with each other.

In some embodiments, the first server is configured to predict a status of the first mobile banking resource, and the second server is configured to predict a status of the second mobile banking resource.

It is to be understood that both the foregoing summary and the following detailed description are exemplary and explanatory only and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The present disclosure is generally directed to systems and methods for conducting a transaction using a mobile banking resource. The system may include an unmanned motorized vehicle, a controller configured to control the movement of the motorized vehicle, an authentication device configured to verify the identity of a user, and a user interface module configured to interface with the user conducting a transaction. The user interface module may include a user input device configured to receive user input and a communication interface module configured to communicate with a server and the user input device. The controller may be configured to operate the motorized vehicle to move the motorized vehicle to a location based on a predicted behavior of the user. The system may also include a server configured to communicate with the controller and the authentication device.

The user interface module of the mobile banking resource may further include a graphical user interface, an audio-visual interface, or a teletypewriter. The user interface module may be located within the motorized vehicle. The motorized vehicle of the mobile banking resource may further include a secure compartment for the user to conduct the transaction. The authentication device of the mobile banking resource may be configured to communicate with one or both of the user interface module and the server. The mobile banking resource may include a global positioning system (GPS) locator configured to determine the location of the motorized vehicle.

The controller of the mobile banking resource is configured to operate the motorized vehicle based on a predicted activity of the user or a predicted event. The controller may be physically and operatively connected with the motorized vehicle, and configured to communicate with the server. The mobile banking resource may be configured to communicate with one or more mobile banking resources through the server. The controller and the communication interface module may be configured to receive instructions from the server. The controller of the mobile banking resource is configured to operate the motorized vehicle to a location based on a predicted activity of the user or a predicted event.

The method may include predicting, by a server, a user location where the mobile banking resource is needed based on a predicted behavior of a user. The method may also comprise configuring a controller to control the movement of the mobile banking resource to the predicted location of the user, authenticating, by an authentication device, the identity of the user, and granting the user access to a user interface module for conducting the transaction. The user interface module may include a user input device configured to receive user input, and a communication interface module configured to communicate with the server and the user input device.

Reference will now be made in detail to the disclosed embodiments, examples of which are illustrated in the accompanying drawings.

Figure 1:
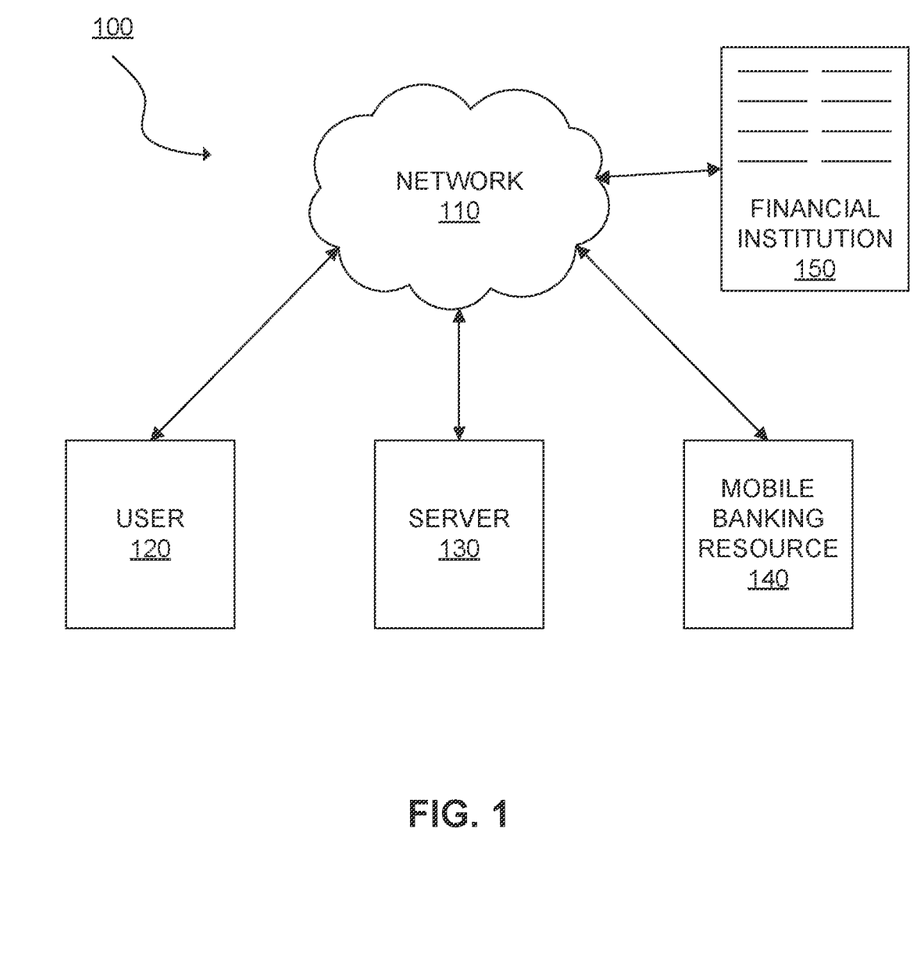
FIG. 1 shows a block diagram of an exemplary mobile banking resource system, consistent with disclosed embodiments.

FIG. 1 is a block diagram of an exemplary mobile banking resource system, consistent with disclosed embodiments. Mobile banking resource system 100 may include a network 110, a user 120, a database server 130, a mobile banking resource 140, and a financial institution 150. Mobile banking resource system 100 may also include other components, not shown in FIG. 1, for example, one or more databases to store transaction data, additional servers, a mobile device operable by a user, etc. Although FIG. 1 illustrates only one of each of network 110, user 120, database server 130, mobile banking resource 140, it is contemplated that mobile banking resource system 100 may include any number of networks 110, users 120, database servers 130, mobile banking resources 140, and/or financial institutions 150.

In some embodiments, as shown in FIG. 1, user 120 may communicate with network 110 via one or more communication devices, including telephones, cellular phones, smart phones, tablet, computers, desktop computers, smartphone applications, etc. Any suitable device that enables user 120 to communicate with network 110 may be used as necessary.

In some embodiments, user 120 may be associated with a mobile device (not shown) such as a smart phone, a laptop computer, a handheld computer, a tablet, a cellular phone, etc. The mobile device may communicate with mobile banking resource 140, financial institution 150, or database server 130 via network 110. In some embodiments, a mobile device may communicate with any or all of these elements directly using any suitable communication means, including, but not limited to, Wi-Fi, Near Field Communication, Bluetooth, Cloud, wired, two-way wireless communication, InfraRed (IR), etc.

Database server 130 may communicate with several resources, including financial institution 150, network 110, user 120, and banking resource 140. Database server 130 may communicate with financial institution 150 and banking resource 140 directly or via network 110. In some embodiments, database server 130 may communicate with user 120, for example, via a mobile device associated with user 120, directly or through network 110. Database server 130 may manage availability, deployment, and resupply of mobile banking resource 140 through communication, either directly or through network 110.

In some embodiments, database server 130 may contain information associated with user 120, a mobile device associated with user 120, financial institution 150, mobile banking resource 140, and other relevant information that may assist managing mobile banking resources (such as mobile banking resource 140 in FIG. 1) for an enhanced banking experience for user 120.

Database server 130 may contain information about user 120, for example, but not limited to, age, gender, marital status, qualification, employment, academic background, ethnicity, geographic location, financial status, calendar and schedule information, etc. Database server 130 may also contain information about user preferences, including, but not limited to, banking activities, social events, daily and weekly schedules, shopping preferences, holiday schedules, vacation plans, travel preferences, and family gatherings. In some embodiments, database server 130 may contain information associated with scheduled public events in a geographic location, for example, a concert, a fair, a parade, or a sports event.

Database server 130 may acquire some or all of the user and user preference information through network 110. In some embodiments, database server 130 may acquire some or all of the user and user preference information through a mobile device associated with user 120 in communication with network 110 or directly through the mobile device associated with user 120.

In some embodiments, database server 130 may comprise one or more processing units configured with appropriate software to manage mobile banking resource 140 for user 120. For example, database server 130 may deploy mobile banking resource 140 to the location of user 120 based on predicting events of interest for user 120 and, optionally, one or more of user information, user preference information, event information, geographic location information, or availability information.

Database server 130 may include, for example, Oracle™ databases, Sybase™ databases, or other relational databases or non-relational databases, such as Hadoop™ sequence files, HBase™ or Cassandra™. Database server 130 may include computing components (e.g., database management system) configured to receive and process requests for data stored in memory devices of database server 130 and to provide data from database server 130. In some embodiments, database server 130 may comprise a general-purpose computer, a mainframe computer, or any combination of these components. Other implementations consistent with disclosed embodiments are possible as well.

Mobile banking resource 140 may comprise mobile ATMs, autonomous ATMs, semi-autonomous ATMs, and manned or unmanned ATMs. In the context of this disclosure, the terms autonomous ATMs, unmanned banking resource, self-driving ATMs, and unmanned ATMs may be used interchangeably depending on the context.

Figure 2A:
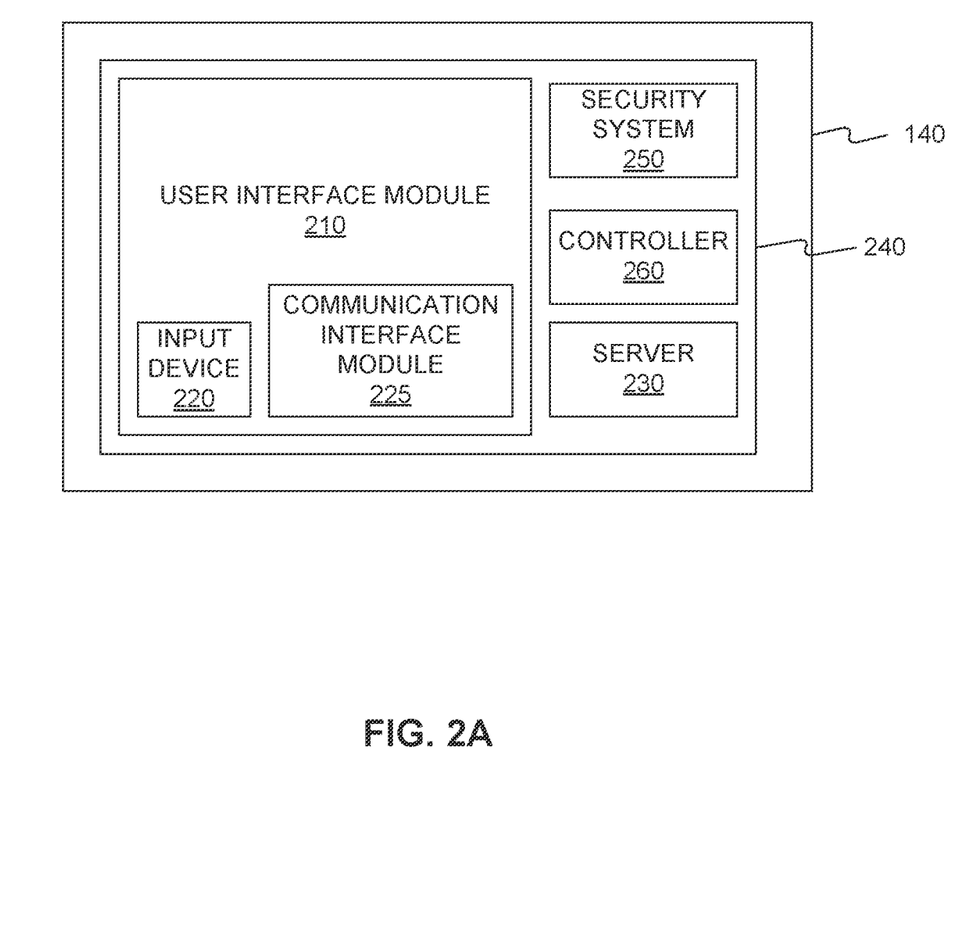
FIGS. 2A and 2B show a block diagram of an exemplary mobile banking resource, consistent with disclosed embodiments.

Referring to FIG. 1, mobile banking resource 140 may include one or more autonomous ATMs (such as autonomous ATM 240 shown in FIG. 2) configured to self-drive to a location. Mobile banking resource 140 may be in communication with financial institution 150, database server 130, and user 120 directly or through network 110. The autonomous ATMs may be completely self-driven without human intervention. In some embodiments, mobile banking resource 140 may include one or more semi-autonomous ATMs that may be partially controlled and/or remotely controlled by a human, as desired.

Financial institution 150 may include a bank, a money management entity, a physical ATM at a branch location, or a physical ATM at other facilities, for example, but not limited to, a supermarket, a grocery store, a mall, a stadium, a convention center, etc. Financial institution 150 may be in communication with database server 130, mobile banking resource 140, and/or user 120 directly or through network 110. In some embodiments, financial institution 150, or one or more similar financial entities, may be a part of or incorporated within mobile banking resource 140. In some embodiments, financial institution 150 may comprise a server, a computing unit, a memory, a database, and other commonly known elements, not illustrated in FIG. 1.

FIG. 2A illustrates an exemplary mobile banking resource 140, consistent with disclosed embodiments. Mobile banking resource 140 may comprise an unmanned motorized vehicle (such as an autonomous ATM 240 of FIG. 2). In some embodiments, mobile banking resource 140 may comprise more than one autonomous ATMs 240, each autonomous ATM 240 comprising a user interface module 210, an input device 220, a communication interface module 225, a server 230, a security system 250, and a controller 260. Other relevant components such as a global positioning system (GPS) receiver and transducer, a display, a video camera, a microphone, a speakerphone, etc. may be present as well. Mobile banking resource 140 may comprise a GPS locator, such as a GPS transceiver, transducer, transponder, etc. In some embodiments, mobile banking resource 140 may include a network of autonomous ATMs 240 in communication with each other and in communication with database server 130 through mobile banking resource 140. Other communication pathways may include utilization of network 110, financial institution 150, etc.

In some embodiments, autonomous ATM 240 may provide an enclosed area in which user 120 may conduct banking transactions and other business within the privacy of autonomous ATM 240. The enclosed area may comprise a secure compartment configured to provide a safe and private environment for the user to perform a transaction while in autonomous ATM 240. In some embodiments, the secure compartment may include safety features including locks, one-way windows, medical assistance, emergency response, etc.

In some embodiments, autonomous ATM 240 may serve a single customer at a time. In some embodiments, autonomous ATM 240 may be configured to serve more than one customer at a time, for example, autonomous ATM 240 may comprise more than one enclosed areas, each comprising a user interface module (such as user interface module 210 of FIG. 2), an input device (such as input device 220 of FIG. 2), a security system (such as security system 250 of FIG. 2), and the like.

As noted above, autonomous ATM 240 may provide banking services. For example, autonomous ATM 240 may include a cash dispenser, a check acceptor, audio-video conferencing equipment, a scanner, a printer, a cash repository, a check collector, etc. Autonomous ATM 240 may communicate with user 120 or user mobile device using any suitable communication means, such as Near Field Communication (NFC), Bluetooth, Wi-Fi, IR, wired communication, etc. In some embodiments, it may further include charging and/or communication interfaces for mobile devices (e.g., USB ports, lightning chargers, inductive chargers, AC power sources, 12-V outlets, etc.).

In some embodiments, autonomous ATM 240 may communicate with user 120 through a user mobile device to conduct a banking transaction beforehand. For example, user 120 may request to "withdraw cash" from his banking account using the mobile device or a personal desktop computer before user 120 arrives at autonomous ATM 240 (or before autonomous ATM 240 arrives at the location of the user). User 120 may be provided with a security token, a one-time password, a transaction identification number, etc. that may be used to authenticate the transaction. Other suitable authentication and identification verification means may be employed. Autonomous ATM 240 may receive a notification of the conducted banking transaction by user 120 through database server 130 or network 110 in communication with user 120 or user mobile device. Upon arrival at the predetermined location (e.g., user 120 arriving at the location of autonomous ATM 240 or autonomous ATM 240 arriving at the location of user 120), user 120 may approach autonomous ATM 240 and complete the "withdraw cash" transaction by providing to autonomous ATM 240 the security token, the one-time password, the transaction identification number, other suitable authentication methods. Additional security systems may be used to verify user identity and authenticate the banking transaction.

Autonomous ATM 240 may include user interface module 210, as illustrated in FIG. 2. User interface module 210 may include, but is not limited to, a graphical user interface, an audio-visual display equipment, a touch-screen, a handheld display screen, an interactive display, a teletypewriter, etc. In some embodiments, autonomous ATM 240 may provide user 120 with Internet access via user interface module 210, or by a wireless or wired connection to user's mobile device. User interface module 210 may be coupled with one or more of input device 220, communication interface module 225, controller 260, security system 250, and server 230. In some embodiments, user interface module 210 may directly communicate with database server 130 and/or network 110. User interface module 210 may be located within autonomous ATM 240.

In some embodiments, input device 220 may be a part of user interface module 210. For example, a virtual keyboard, a physical keyboard, a number pad, an audio input, a telephone, a microphone, etc. may be used to input selections during a transaction. Input device 220 may be used to communicate with a bank representative, financial advisor, bank branch manager, for example, via a telephone or a short message service (SMS). In some embodiments, input device 220 may directly communicate with a server of financial institution 150, or database server 130, or network 110, or the like. Input device 220 may be connected to user interface module 210 through a wired connection, for example, using a universal serial bus (USB) connector, a mini-USB connector, a micro-USB connector, a D-type connector, an external line return (XLR) connector, an ethernet connector, or the like. In some embodiments, input device 220 may be wirelessly connected to user interface module 210, for example, through Wi-fi, internet, wireless local area network (WLAN), personal area network (PAN), local area network (LAN), etc. Other suitable wired and wireless connections may be employed.

In some embodiments, some or all data communicated from autonomous ATM 240 through user interface module 240 and/or input device 220 may be encrypted using communication interface module 225 for communication with back-end infrastructure, side-channel attack prevention techniques employed for maximum security, etc. For example, communication interface module 225 may encrypt the sensitive information associated with user 120, user preferences, user passwords, bank account information, etc. prior to sharing with database server 130, financial institution 150, or the like. In some embodiments, communication interface module 225 may decrypt the sensitive information associated with user 120, user preferences, user passwords, bank account information, etc. prior to sharing with user 120. Communication interface module 225 may display the decrypted information on display of user interface module 210, or another display, for example, a virtual reality screen, a head-mounted display, a handheld display, etc. In some embodiments, communication interface module 225 may communicate with a mobile device of user 120 to receive input information from and display decrypted output information to the user's mobile device. Communication interface module 225 may communicate with database server 130 and/or server 230, directly or via network 110. As illustrated in FIG. 2, communication interface module 225 may be a part of user interface module 210.

Referring to FIG. 2A, autonomous ATM 240 may include server 230. Server 230 may comprise a local server configured to store, process, and share information associated with autonomous ATM 240. For example, server 230 may contain information about autonomous ATM 240, including, but not limited to, geographical location information, operational status information, availability information, etc. In some embodiments, server 230 may be configured to share information associated with autonomous ATM 240 in real-time. For example, if autonomous ATM 240 is serving a customer, server 230 may relay the status as "busy" to database server 130, financial institution 150, mobile banking resource 140, and/or another user. Other status identifiers such as "available," "out-of-order," "running late," etc. may be relayed accordingly as well. Server 230 may receive service requests from customers through their mobile devices, from database server 130, from mobile banking resource 140, and/or from financial institution 150, directly or through network 110.

In some embodiments, mobile banking resource 140 comprises server 230. Server 230 of mobile banking resource 140 may communicate with one or more autonomous ATMs 240, the communication including, but not limited to, tracking the location, guiding to destination, providing feedback, etc. Server 230 may include, for example, Oracle™ databases, Sybase™ databases, or other relational databases or non-relational databases, such as Hadoop™ sequence files, HBase™, or Cassandra™. Server 230 may include computing components (e.g., database management system) configured to receive and process requests for data stored in memory devices of server 230 and to provide data from database server 130. In some embodiments, server 230 may comprise a general-purpose computer, a mainframe computer, a processing unit, a microprocessor, etc. Other implementations consistent with disclosed embodiments are possible as well.

In some embodiments, autonomous ATM 240 may comprise security system 250 to authenticate user 120 prior to performing a transaction. Security system 250 may include authentication equipment including hardware and software components. For example, security system 250 may comprise a camera, a biometric sensor, a keypad, a touchscreen, a microphone, etc. Security system 250 may authenticate user 120 using identification verification techniques including, for example, face recognition, iris recognition, fingerprint recognition, signature, voice recognition, password exchange, or combinations thereof.

In some embodiments, on-board authentication may continue using, for example, face recognition, voice recognition, biometric-based recognition, etc. while user 120 is performing a transaction. In some embodiments, existing authentication, or additional authentication, from a mobile device or other personal device of user 120 may be used in the authentication process. Authentication may be an independent security process as well as a continuous monitoring process that may run in the background while user 120 is performing a transaction. For each transaction, the security requirements may be determined, and user 120 may be taken through the appropriate authentication processes using on-board or other available resources.

Security system 250 may communicate with database server 130, financial institution 150, and/or a trusted secured agency to verify and/or monitor user identity prior to and during the transaction. In some embodiments, security system 250 may rely on communication interface module 225 to facilitate communication between security system 250 and financial institution 150, database server 130, or the like. In some embodiments, security system 250 may communicate with user interface module 210, server 230, and/or database server 130, or the like.

Due to their mobility, autonomous ATMs 240 may be equipped with other security features. For example, autonomous ATM 240 may be equipped to lock its doors, alert authorities, and/or transport user 120 to a law enforcement location, if, for example, a fraudulent activity or an attempt to hijack or vandalize is detected. In some embodiments, a response to fraud may be initiated. In some embodiments, autonomous ATM 240 may respond by shutting down or otherwise becoming inactive or unresponsive, recording its surroundings (e.g., video, audio, GPS location, user login information), defacing the currency or otherwise marking or destroying the valuables it contains, and/or relaying information to alert authorities, bank officials, and/or law enforcement officers.

In some embodiments, security system 250 may adjust security features and/or services provided based on the assessed potential risk. Autonomous ATM 240 may assess potential risk based on predetermined factors, including, but not limited to, destination location of request, user profiles, time of the day, proximity to "unsafe" regions, etc. For example, autonomous ATM 240 may require additional security features or may not travel to high-crime areas or areas with a high occurrence rate of reported security issues.

Autonomous ATM 240 may further comprise controller 260. In the context of this disclosure, controller 260 may comprise a "processor" or an "engine" of autonomous ATM 240. Controller 260 may comprise a battery-operated engine to facilitate motion of autonomous ATM 240. Controller 260 may autonomously operate or maneuver autonomous ATM 240 to a predetermined location. Controller 260 may be physically and operatively connected with autonomous ATM 240. The location may be predetermined based on a predicted behavior of user 120, or multiple users. Alternatively, the location may be requested by user 120 or multiple users. Controller 260 may communicate with database server 130 or server 230 of mobile banking resource 140 to receive destination location information. Controller 260 may drive autonomous ATM 240 to a destination where user 120 may be expected to be present based on user 120's predicted behavior, user 120's predicted schedule, etc. For example, user 120 may prefer shopping at a fresh produce market every first and third Saturday of the month, and may prefer buying lunch from the food trucks at a certain location on a particular day every week, as determined by user 120's GPS location information.

As explained above, user 120 is intended to refer broadly to both a single user and any number of users. Accordingly, it is to be understood that this disclosure also encompasses embodiments where controller 260 may drive autonomous ATM 240 to a destination where multiple users may be expected to be present based on multiple users' predicted behaviors, multiple users predicted schedules, etc. This example is explicitly provided here to ensure clarity of the specification, but any reference to user 120 should be understood as broadly encompassing both a single user 120 and any number of users whenever applicable.

In some embodiments, database server 130 or server 230 may receive location information of user 120, analyze patterns, and predict user behavior based on location information and analyzed patterns using machine learning or deep learning networks. In some embodiments, processing unit of database server 130 or processing unit of server 230 may receive location information of user 120, analyze patterns, and predict user behavior based on location information and analyzed patterns, using machine learning or deep learning networks.

In some embodiments, analyzing patterns may comprise analyzing behavioral information such as, but not limited to, schedules, amount of money spent, number of items purchased per session, amount of time spent at a business or an event, time of the day, day of the week, number of users present, etc. In some embodiments, user personal information such as, but not limited to, age, gender, address, social activities, educational background, employment details, ethnicity, etc. may be used in conjunction with behavioral information to analyze patterns and predict user behavior.

In some embodiments, information from third party sources, for example, audio-visual sources, such as, but not limited to, surveillance cameras, closed circuit television cameras (CCTV), or the like, may be used to provide data to determine possible "locations of interest" or destinations for autonomous ATM 240. For example, database server 130 may communicate with a CCTV camera to receive vehicular and/or pedestrian traffic information of a certain location. Processing unit of database server 130 may determine increased activity levels based on vehicular traffic information or pedestrian traffic information.

In some embodiments, server 230 of autonomous ATM 240 may communicate with a CCTV camera to receive vehicular and/or pedestrian traffic information of a certain location. Processing unit of server 230 may determine increased activity levels based on vehicular traffic information or pedestrian traffic information, and autonomous ATM 240 may drive itself to the desired location. In some embodiments, autonomous ATM 240 may drive itself to the desired location based on predicted higher volume of banking service requests using machine learning or deep learning networks. One or more autonomous ATM 240 may self-drive to the desired location, as needed.

In some embodiments, machine learning or deep learning networks may comprise, for example, an artificial intelligence system, a neural network, a deep-learning technique, a software implemented algorithm, or the like.

Controller 260 may communicate with and/or rely on a GPS unit of autonomous ATM 240 to receive directions and/or calculate a route (e.g., a fastest, quickest, most direct, and/or most secure route) to get to a predetermined location. In some embodiments, database server 130 or server 230 may relay directions and route information to controller 260. In some embodiments, controller 260 may monitor, record, and communicate the overall operational health or status of autonomous ATM 240. For example, controller 260 may monitor and periodically update information on remaining battery power or fuel level to server 230 or database server 130.

Controller 260 may include a maneuvering module (not shown) to operate autonomous ATM 240. An exemplary maneuvering module may comprise components configured to perform operations such as acceleration, deceleration, steering, braking, parking, signaling, etc. In some embodiments, autonomous ATM 240 may be equipped with relevant sensors for safe operation and maneuverability.

Figure 2B:
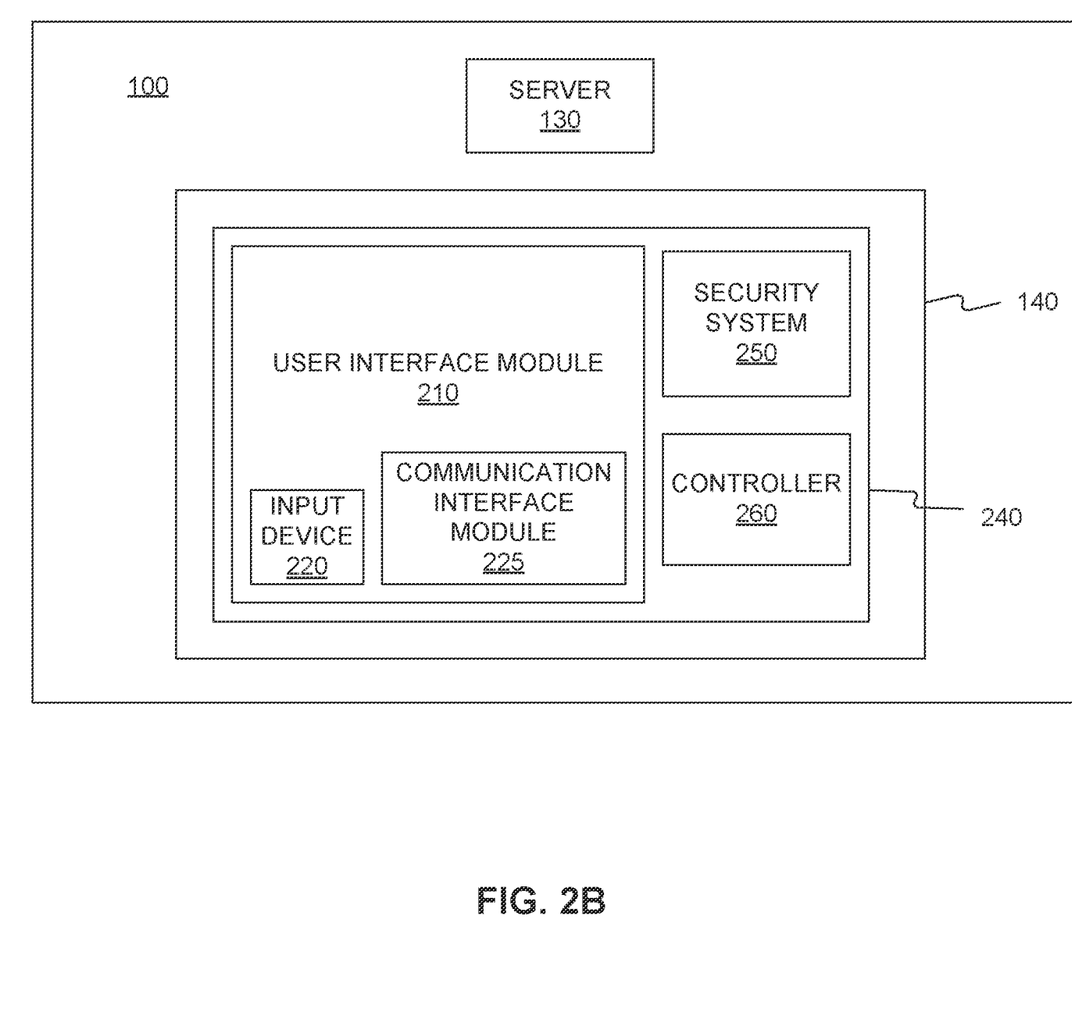

In some embodiments, autonomous ATM 240 may rely on server 130 of mobile banking resource system 100 to receive information, for example, location information of user 120, analyze patterns, and predict user behavior based on location information, as shown in FIG. 2B. Server 130 may be configured to predict status of autonomous ATM 240 and location of the user. For example, server 130 may predict location of user 120 based on analyzing user personal information, behavior and social media feed, etc. Based on a predicted user location, server may predict the status of autonomous ATM 240 serving user 120 at the location.

In some embodiments, server 130 may be configured to predict availability of one or more autonomous ATM 240 in mobile banking resource system 100. The availability information associated with one or more autonomous ATM 240 may be used to enhance user experience. Server 130 may use the information associated with availability and operational status of autonomous ATM 240 to effectively manage resources of mobile banking resource system 100 by need-based allocation. For example, an "idle" autonomous ATM 240 may be deployed to a predicted busy location, or an autonomous ATM 240 may be parked for re-charging based on predicted demand volume.

Figure 3:
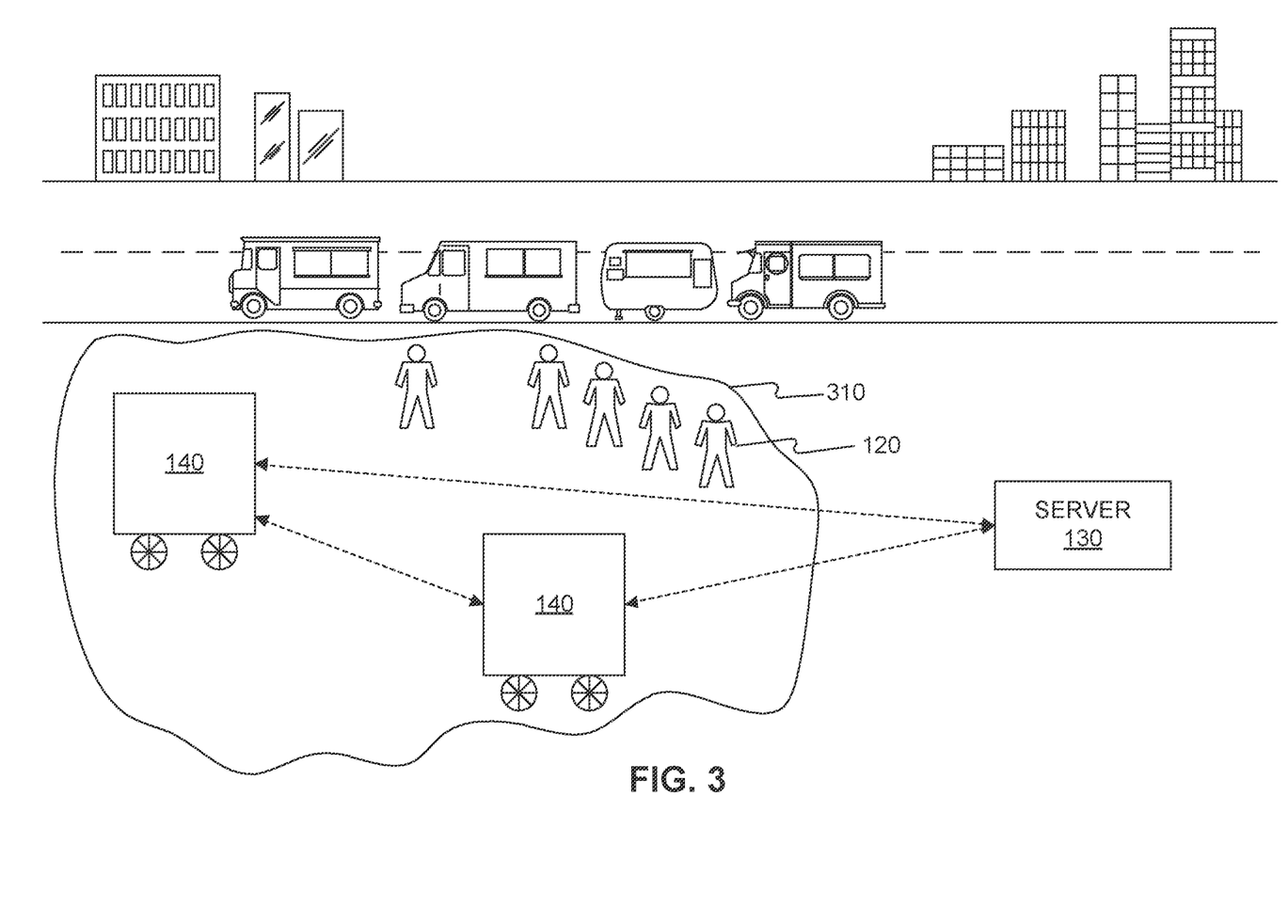
FIG. 3 illustrates an exemplary predictive mobile banking resource system, consistent with disclosed embodiments.

FIG. 3 illustrates an exemplary predictive mobile banking resource system 300, consistent with disclosed embodiments. Autonomous ATM 240 (not shown in FIG. 3) or mobile banking resource 140 may be proactively deployed to a destination where cash or ATM demands may increase. Autonomous ATM 240 or mobile banking resource 140 may be proactively deployed to arrive at destination at or before a predetermined time of increased cash or ATM demand. Mobile banking resource 140 or autonomous ATM 240 may be proactively deployed to a destination at a predetermined time based on predicted behavior of customers or user 120. In some embodiments, mobile banking resource 140 or autonomous ATM 240 may self-drive to the destination at a predetermined time based on predicted user behavior. As explained above, user 120 may refer to an individual customer, a group of customers, or the like.

In some embodiments, one or more back-up autonomous ATMs 240s or mobile banking resources 140 may self-drive to the destination where an in-use mobile banking resource 140 may be running low on resources, out of order, etc. Alternatively, server 230 of in-use autonomous ATM 240 or mobile banking resource 140 may communicate the status of in-use autonomous ATM 240 or mobile banking resource 140 to one or more of database server 130, server(s) of back-up autonomous ATMs, financial institution 150, mobile banking resources 140, or network 110, which may lead to deployment of another autonomous ATM 240 or mobile banking resource 140 to accommodate the increased demand or provide back-up support to in-use autonomous ATM 240 or mobile banking resource 140.

In some embodiments, if necessary, mobile banking resource 140 or autonomous ATM 240 may visit a branch location, a recharge station, a resupply center, etc. if it is low on resources. In some embodiments, more than one mobile banking resources 140 and/or autonomous ATMs 240 may rendezvous and reallocate resources as necessary and/or desired.

Referring to FIG. 3, mobile banking resources 140 (or autonomous ATM 240 (not shown)) may self-drive or self-deploy to a predicted location 310 at a predicted time of increased banking activity. For example, predicted location 310 may be a food-truck park, a sports event, a concert, a social gathering, a state fair, etc. In some embodiments, machine learning networks, artificial intelligence networks, deep learning algorithms, etc. may be employed to teach autonomous ATM 240 or mobile banking resource 140 to predict locations and times of increased banking activity. Machine learning networks may be employed to predict user activity based on information associated with user 120, user preferences, user behavior, etc.

Figure 4:
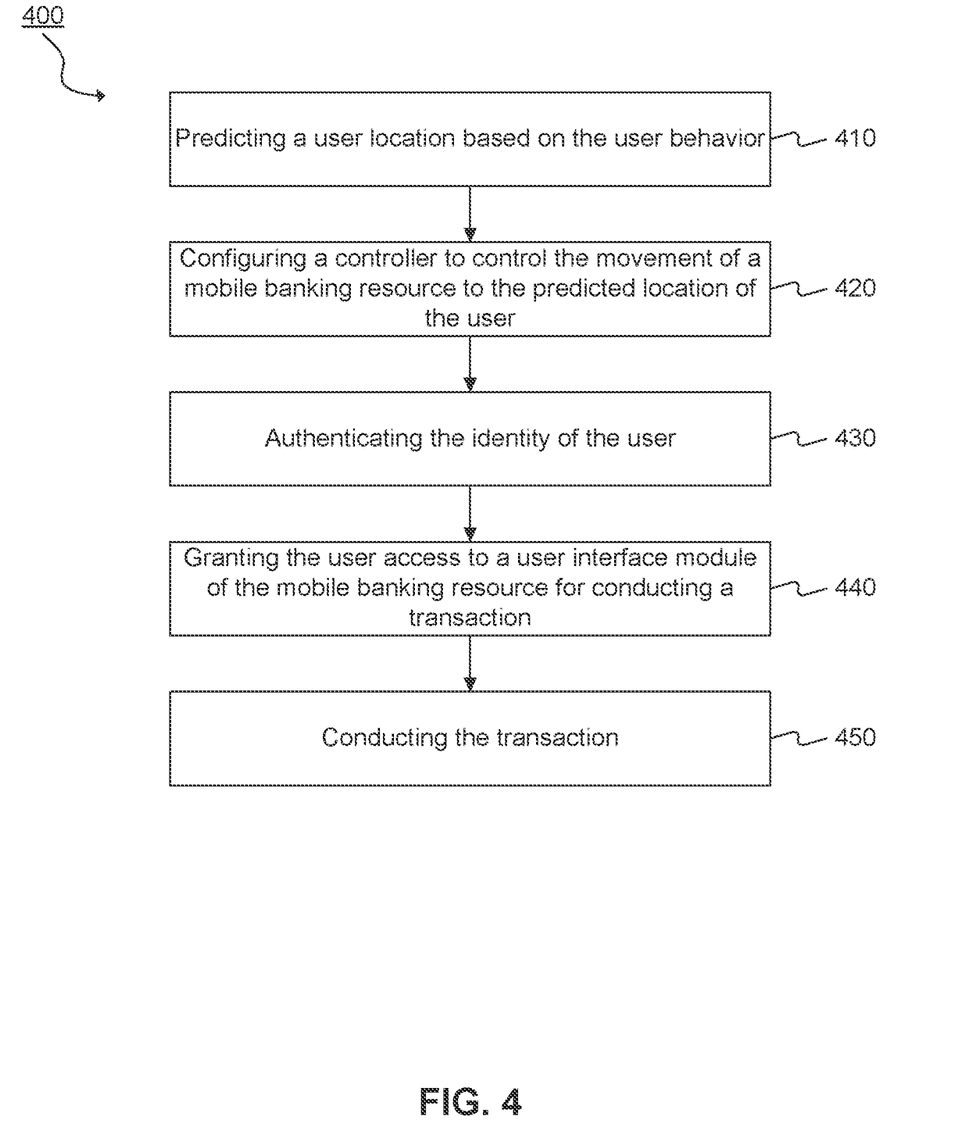
FIG. 4 is a flow chart illustrating an exemplary method of conducting a transaction using a mobile banking resource, consistent with disclosed embodiments.

One aspect of the present disclosure is directed to a method of conducting a transaction using mobile banking resources (e.g., autonomous ATM 240, shown in FIG. 2) consistent with disclosed embodiments. FIG. 4 is a process flowchart illustrating an exemplary method of conducting a transaction using mobile banking resources in accordance with the disclosed embodiments. The order and arrangement of steps in process 400 is provided for purposes of illustration. As will be appreciated from this disclosure, modifications may be made to process 400 by, for example, adding, combining, removing, and/or rearranging the steps for process 400.

An exemplary method 400 of conducting a transaction using mobile banking resources may include predicting user (e.g., user 120, as shown in FIG. 1) location based on user behavior, as shown in step 410. In some embodiments, step 410 may include predicting user location and predicting the time that the user is predicted at the location based on predicted user behavior. In some embodiments, machine learning networks, artificial intelligence networks, and/or deep learning algorithms may be used to predict user location and/or time based on user behavior.

In some embodiments, machine learning and/or deep learning algorithms may be executed by processing units (e.g., processing unit of server 230 or database server 130). Financial institutions including banks, corporations (e.g., financial institution 150 of FIG. 1), and mobile banking resources 140 may include processing units as well, the processing units configured to execute machine learning algorithms for predicting user location based on user behavior.

In step 420, a controller (e.g., controller 260) may be configured to control the movement of a mobile banking resource, for example, an unmanned motorized vehicle, to the predicted location of the user. In some embodiments, the controller may be configured to operate the unmanned motorized vehicle to the predicted location of the user. Configuring a controller may include receiving information associated with predicted user location, predicted time, predicted banking service, directions to the user location, traffic updates, alternative routes to the user location, etc. from server 230 through a communication interface module (e.g., communication interface module 225 of FIG. 2). Configuring the controller may further include programming directions to the predicted user location, speed limits, traffic rules, etc.

In some embodiments, the controller may communicate with the user via a user's mobile device to indicate expected time of arrival, real-time status, and real-time location information, etc. The controller may also be configured to initiate the user authentication process beforehand or engage the user in a conversation to enhance user experience.

In step 430, an authentication device (e.g., security system 250 of FIG. 2) may be configured to authenticate the user prior to performing a transaction. The authentication device may communicate with a user interface module (e.g., user interface module 210, shown in FIG. 2). In some embodiments, the authentication device is incorporated within the user interface module. The authentication device or security system may include authentication equipment including hardware and software components. For example, security system may comprise a camera, a biometric sensor, a keypad, a touchscreen, a microphone, etc. The security system may authenticate the user using identification verification techniques including, for example, face recognition, iris recognition, fingerprint recognition, signature, voice recognition, password exchange, or combinations thereof.

The user interface module may receive user input in one or more formats, including, but not limited to, audio, video, textual, or combinations thereof. The user interface module may be configured to exchange information with a server or a financial institution through a communication interface module (e.g., communication interface module 225 of FIG. 2). In some embodiments, the user input information may be uploaded to a network (e.g., network 110, shown in FIG. 1), and subsequently shared with the database server or the financial institution.

In some embodiments, autonomous ATM 240 may use on-board components to authenticate a user. For example, face recognition-based authentication using onboard cameras, voice recognition using microphones, finger or palm printing based biometric authentication using finger/palm scanners, iris biometrics using iris scanners, behavioral and multimodal biometrics using multiple channels such as video (e.g., motion biometrics), authentication received from the user's mobile devices, a password input by the user, and/or any combination of these may be used as necessary and/or desired.

In some embodiments, the user may be pre-authenticated, or pre-authentication may be optional. In some embodiments, the user may be prompted to present an ATM card, credit card, identification card, etc. and enter a personal identification number (PIN) prior to performing a transaction.

In step 440, once the user is authenticated, the user may be granted permission to initiate or perform a transaction, e.g., a banking transaction such as withdrawal of cash, deposit checks, check account balance, exchange foreign currency, etc. In some embodiments, the user may use video conferencing equipment, audio conferencing equipment, short messaging system, online messaging, etc. to communicate with a bank official, bank representative, or the like.

In some embodiments, once the user is authenticated, the user may be granted access to a user interface module allowing the user to continue performing the transaction. In some embodiments, the user may be continuously authenticated and monitored. For example, the user's movement and behavioral biometrics may be monitored and/or recorded while performing the transaction. If, for example, suspicious activity or a break-in attempt is detected during the transaction, the authenticated session may be terminated.

In step 450, the user may conduct the transaction in the secure compartment of the autonomous ATM. Once the transaction is complete, the status of the autonomous ATM may be updated. For example, the amount of cash reserve, battery remaining, current location information, etc. may be transmitted, for example, to a server and/or financial institution through a communication interface module. In some embodiments, the database server may receive real-time status information associated with autonomous ATM 240.

Figure 5:
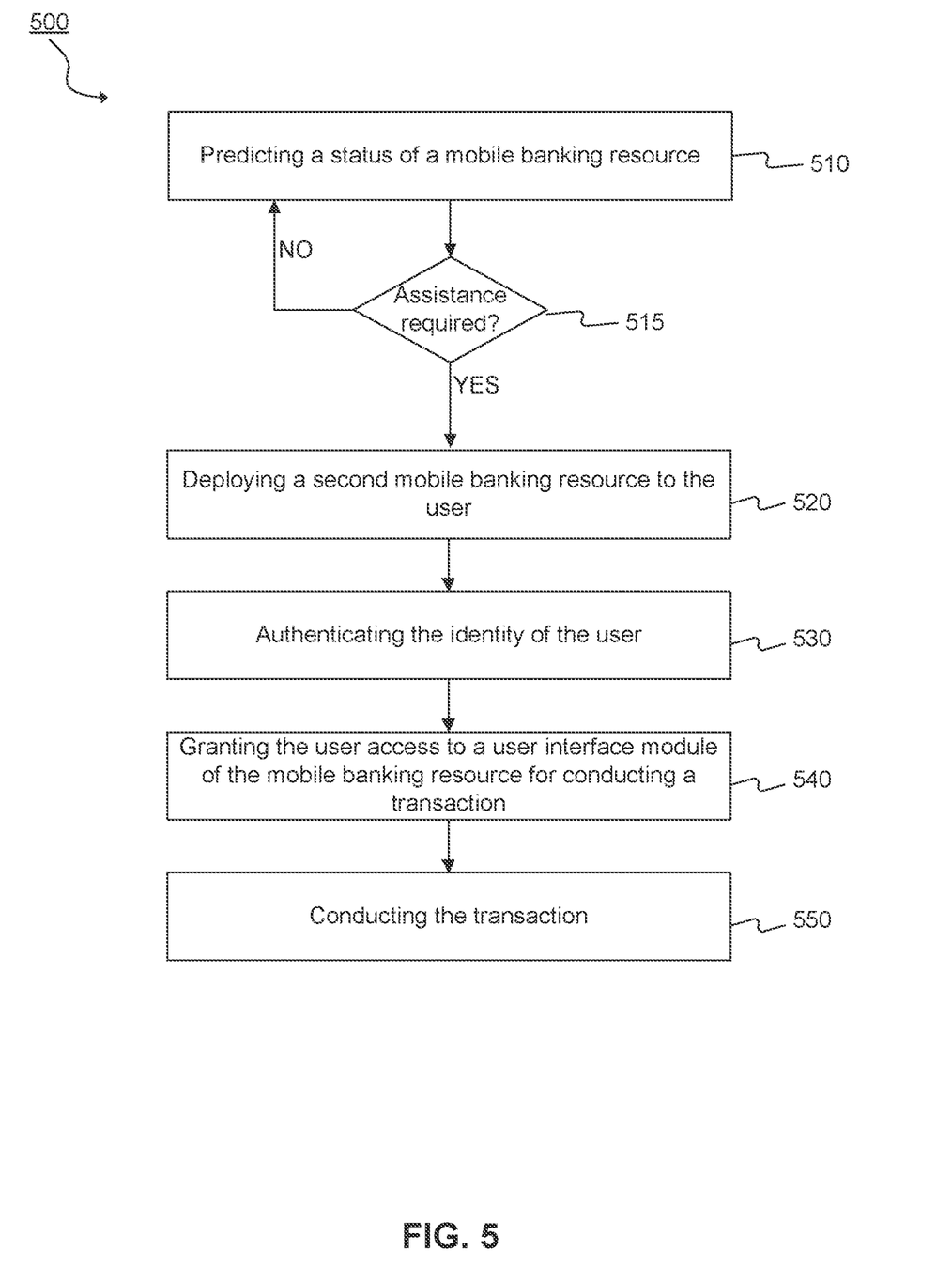
FIG. 5 is a flow chart illustrating an exemplary method of conducting a transaction using a predictive mobile banking resource, consistent with disclosed embodiments.

Another aspect of the present disclosure is directed to a method of conducting a transaction using mobile banking resources (e.g., autonomous ATM 240, shown in FIG. 2) consistent with disclosed embodiments. FIG. 5 is a process flowchart illustrating an exemplary method of conducting a transaction using mobile banking resources, in accordance with the disclosed embodiments. The order and arrangement of steps in process 500 is provided for purposes of illustration. As will be appreciated from this disclosure, modifications may be made to process 500 by, for example, adding, combining, removing, and/or rearranging the steps for process 500.

An exemplary method 500 of conducting a transaction using mobile banking resources may include predicting a status of the mobile banking resource, e.g., an autonomous ATM, or the unmanned motorized vehicle, as shown in step 510. In some embodiments, step 510 may include predicting status of the autonomous ATM using machine learning algorithms, neural network processing, artificial intelligence, and/or other suitable deep learning networks. The status of the autonomous ATM may include information associated with the current location information, cash reserve, overall operability, mechanical and electrical issues, schedule, etc.

In some embodiments, machine learning algorithms may predict whether the autonomous ATM will require assistance based on the predicted status of the autonomous ATM 240, as shown in step 515. Machine learning algorithms may use information stored in the database server, a server of the autonomous ATM 240, or receive information directly from the autonomous ATM. For example, a machine learning algorithm may use predicted schedule information of one autonomous ATM, including predicted destination information, predicted time information, and predicted volume of service requests, etc. to determine whether a second autonomous ATM will be needed. The predicted schedule information may be stored in one or more locations, for example, a database server, a server of the autonomous ATM, a server of the financial institution, a network, etc.

Based on the prediction response in step 515, a second autonomous ATM may self-deploy to the desired location, as shown in step 520. In some embodiments, the second autonomous ATM may comprise a processing unit (e.g., a processing unit of controller 260, discussed but not shown) configured to execute machine learning algorithm configured to predict the status of the first autonomous ATM.

In step 530, the second autonomous ATM may comprise an authentication device (e.g., security system 250 of FIG. 2) configured to authenticate the user prior to performing a transaction by the user. The authentication device may communicate with the user interface module. In some embodiments, the authentication device is incorporated within the user interface module. The authentication device or security system may include authentication equipment including hardware and software components. Security system may authenticate the user using identification verification techniques including, face recognition, iris recognition, fingerprint recognition, signature, voice recognition, password exchange, and/or combinations thereof. Other relevant methods of identification verification commonly known in the art may be employed.

In step 540, once the user is authenticated, the user may be granted permission to initiate a transaction and/or granted access to the user interface module to perform a transaction, e.g., a banking transaction such as withdrawal of cash, deposit checks, check account balance, exchange foreign currency, etc. In some embodiments, the user may use video conferencing equipment, audio conferencing equipment, short messaging system, online messaging, etc. to communicate with a bank official, bank representative, or the like.

In step 550, the user may conduct the transaction at the second autonomous ATM. The status of the second autonomous ATM may be updated after the transaction is complete. In some embodiments, the status of the second autonomous ATM may be updated in real-time while the user is performing the transaction.

The foregoing descriptions have been presented for purposes of illustration and description. They are not exhaustive and are not limited to the precise forms or embodiments disclosed. Modifications and adaptations will be apparent to those skilled in the art from consideration of the specification and practice of the disclosed embodiments. For example, the described implementation includes software, but embodiments of the disclosure may be implemented as a combination of hardware and software or in hardware alone.

Other embodiments of the invention will be apparent to those skilled in the art from consideration of the specification and practice of the embodiments disclosed herein. The specification and examples should be considered as exemplary only, with a true scope and spirit of the disclosure being indicated by the following claims.

What is claimed is:

1. A system for facilitating a transaction via one or more unmanned motorized vehicles, the system comprising:
   a computer system comprising one or more processors programmed with computer program instructions that, when executed, cause the computer system to perform operations comprising:
      in response to obtaining a deposit request for a deposit transaction from a mobile device of a user while the mobile device is at a first location, transmitting a transaction verification code associated with the deposit transaction to the mobile device while the mobile device is at the first location;
      determining, based on user information related to the user, a second location where a mobile banking resource is predicted to be needed, the user information indicating one or more predicted activities, behaviors, or events related to the user, the second location being different from the first location;
      causing, based on the determination of the second location and the deposit request, an unmanned motorized vehicle corresponding to the mobile banking resource to move to the second location to complete the deposit transaction of the deposit request;
      subsequent to the unmanned motorized vehicle moving to the second location, obtaining the transaction verification code via the unmanned motorized vehicle, the transaction verification code being obtained via the unmanned motorized vehicle while the unmanned motorized vehicle is proximate the second location; and
      in response to obtaining the transaction verification code, authorizing completion of the deposit transaction via the unmanned motorized vehicle while the unmanned motorized vehicle is proximate the second location.

2. The system of claim 1, wherein the unmanned motorized vehicle comprises an automated teller machine.

3. The system of claim 1, the operations further comprising:
   obtaining identity verification information of the user via the unmanned motorized vehicle while the unmanned motorized vehicle is proximate the second location,
   wherein authorizing the completion of the deposit transaction comprises authorizing the completion of the deposit transaction in response to obtaining the transaction verification code and the identity verification information.

4. The system of claim 3, wherein the identity verification information comprises one or more image or audio representations indicative of the user.

5. The system of claim 4, wherein the one or more image or audio representations comprises one or more representations of a face, eye, fingerprint, or voice of the user.

6. The system of claim 3, wherein the identity verification information comprises an identification code associated with the user or card information related to a transaction or identification card associated with the user.

7. A non-transitory computer-readable media storing instructions that, when executed by one or more processors, cause operations comprising:
    obtaining a transaction request for a transaction from a user device of a user while the user device is at a first location;
    transmitting, based on the transaction request, a transaction verification code associated with the transaction to the user device;
    causing, based on the transaction request, a mobile banking resource to move to a second location where the mobile banking resource is predicted to be needed, the second location being different from the first location; and
    in response to obtaining the transaction verification code via the mobile banking resource, authorizing completion of the transaction request, the transaction verification code being obtained via the mobile banking resource while the mobile banking resource is proximate the second location.

8. The media of claim 7, wherein the mobile banking resource comprises an automated teller machine.

9. The media of claim 7, the operations further comprising:
    predicting the second location based on one or more predicted activities, behaviors, or events related to the user.

10. The media of claim 7, wherein obtaining the transaction request comprises obtaining a deposit request for a deposit transaction from the user device while the user device is at the first location, and
    wherein authorizing the completion of the transaction comprises authorizing completion of the deposit transaction based on the transaction verification code.

11. The media of claim 7, wherein obtaining the transaction request comprises obtaining a withdrawal request for a withdrawal transaction from the user device, the withdrawal request comprising cash withdrawal information inputted at the user device while the user device is at the first location,
    wherein authorizing the completion of the transaction comprises authorizing completion of the withdrawal transaction based on the transaction verification code and the cash withdrawal information.

12. A method being implemented by one or more processors executing computer program instructions that, when executed, perform the method, the method comprising:
    obtaining a transaction request for a transaction from a user device of a user while the user device is at a first location;
    causing, based on the transaction request, a mobile banking resource to move to a second location where the mobile banking resource is predicted to be needed;
    obtaining verification information related to an identity of the user via the mobile banking resource, the verification information being obtained via the mobile banking resource while the mobile banking resource is proximate the second location; and
    performing authentication for completion of the transaction of the transaction request based on the verification information.

13. The method of claim 12, wherein the mobile banking resource comprises an automated teller machine.

14. The method of claim 12, wherein the mobile banking resource comprises an unmanned motorized vehicle.

15. The method of claim 12, further comprising:
    determining the second location based on one or more predicted activities, behaviors, or events related to the user.

16. The method of claim 12, wherein obtaining the transaction request comprises obtaining a deposit request for a deposit transaction from the user device while the user device is at the first location, and
    wherein performing the authentication comprises performing authentication for completion of the deposit transaction of the deposit request based on the verification information.

17. The method of claim 12, wherein obtaining the transaction request comprises obtaining a withdrawal request for a withdrawal transaction from the user device, the withdrawal request comprising cash withdrawal information inputted at the user device while the user device is at the first location,
    wherein performing the authentication comprises performing authentication for completion of the withdrawal transaction of the withdrawal request based on the verification information and the cash withdrawal information.

18. The method of claim 12, further comprising:
    obtaining identity verification information of the user via the mobile banking resource, the identity verification information being obtained while the mobile banking resource is proximate the second location,
    wherein the identity verification information comprises one or more image or audio representations indicative of the user.

19. The method of claim 12, further comprising:
    obtaining identity verification information of the user via the mobile banking resource, the identity verification information being obtained while the mobile banking resource is proximate the second location,
    wherein the identity verification information comprises an identification code associated with the user or card information related to a transaction or identification card associated with the user.

20. The method of claim 12, further comprising:
    completing the transaction via the mobile banking resource based on the authentication for the transaction.

* * * * *